(12) United States Patent
McKinnis et al.

(10) Patent No.: US 7,207,139 B2
(45) Date of Patent: Apr. 24, 2007

(54) VACUUM PICK-UP DEVICE WITH MECHANICALLY ASSISTED RELEASE

(75) Inventors: Michael K. McKinnis, Chehalis, WA (US); William C. Carlson, Olympia, WA (US); Jeffrey E. Hartle, Tacoma, WA (US)

(73) Assignee: Weyerhaeuser Company, Federal Way, WA (US)

( * ) Notice: Subject to any disclaimer, the term of this patent is extended or adjusted under 35 U.S.C. 154(b) by 26 days.

(21) Appl. No.: 10/981,438

(22) Filed: Nov. 3, 2004

(65) Prior Publication Data

US 2005/0108931 A1    May 26, 2005

Related U.S. Application Data

(60) Provisional application No. 60/525,530, filed on Nov. 26, 2003.

(51) Int. Cl.
*A01C 1/06* (2006.01)
(52) U.S. Cl. ....................................................... 47/57.6
(58) Field of Classification Search ................ 47/57.6, 47/1.01 R, 58.1 R
See application file for complete search history.

(56) References Cited

U.S. PATENT DOCUMENTS

| 4,278,183 | A | * | 7/1981 | Billington | ................ | 221/211 |
|---|---|---|---|---|---|---|
| 4,995,662 | A | * | 2/1991 | Hawkswell | ................ | 294/64.1 |
| 5,106,139 | A | * | 4/1992 | Palmer et al. | ............. | 294/64.1 |
| 5,284,765 | A | * | 2/1994 | Bryan et al. | ................ | 435/420 |
| 5,467,525 | A | * | 11/1995 | Pine et al. | ..................... | 29/743 |
| 5,561,970 | A | * | 10/1996 | Edie et al. | ..................... | 53/473 |
| 5,840,121 | A | * | 11/1998 | Kohno | ........................ | 118/13 |
| 6,343,823 | B1 | * | 2/2002 | Busby | ........................ | 294/64.1 |
| 6,684,564 | B1 | * | 2/2004 | Hirahara | ..................... | 47/57.6 |
| 2004/0267457 | A1 | * | 12/2004 | Timmis et al. | ................ | 702/19 |
| 2005/0108929 | A1 | * | 5/2005 | Hirahara | ................. | 47/1.01 R |
| 2005/0108935 | A1 | * | 5/2005 | Hirahara | ..................... | 47/57.6 |
| 2005/0108937 | A1 | * | 5/2005 | Hirahara | ..................... | 47/57.6 |
| 2005/0114918 | A1 | * | 5/2005 | Hirahara et al. | ............ | 800/278 |
| 2005/0133528 | A1 | * | 6/2005 | Hirahara | ........................ | 222/1 |

* cited by examiner

*Primary Examiner*—Francis T. Palo
(74) *Attorney, Agent, or Firm*—Christensen O'Connor Johnson Kindness

(57) ABSTRACT

A vacuum pick-up device 20 includes a device body 22 having a pick-up tip opening 78 to which vacuum pressure is supplied. The vacuum pick-up device 20 further includes a mechanical release assisting device 36 that assists in the release of a grasped object contemporaneously with or slightly subsequent to the cessation of vacuum pressure. A manifold 38 may be included to efficiently and effectively supply vacuum pressure to the device body 22 from a vacuum pressure source.

14 Claims, 5 Drawing Sheets

VACUUM PICK-UP DEVICE WITH MECHANICALLY ASSISTED RELEASE

CROSS REFERENCE TO RELATED APPLICATION

The present application claims the benefit of U.S. Provisional Application No. 60/525,530, filed Nov. 26, 2003.

FIELD OF THE INVENTION

The present invention relates to material handling systems, and particularly, to pick-up devices that utilize vacuum pressure to grasp and release objects, such as plant embryos.

BACKGROUND OF THE INVENTION

Modern agriculture, including silviculture, often requires the planting of large numbers of substantially identical plants genetically tailored to grow optimally in a particular locale or to possess certain other desirable traits. Production of new plants by sexual reproduction can be slow and is often subject to genetic recombinational events resulting in variable traits in its progeny. As a result, asexual propagation has been shown for some species to yield large numbers of genetically identical embryos, each having the capacity to develop into a normal plant. Such embryos must usually be further cultured under laboratory conditions until they reach an autotrophic "seedling" state characterized by an ability to produce their own food via photosynthesis, resist desiccation, produce roots able to penetrate soil and fend off soil microorganisms.

Some researchers have experimented with the production of artificial seeds, known as manufactured seeds, in which individual plant somatic or zygotic embryos are encapsulated in a seed coat, such as those disclosed in U.S. Pat. No. 5,701,699, issued to Carlson et al., the disclosure of which is hereby expressly incorporated by reference.

Typical manufactured seeds include a seed coat, a synthetic gametophyte and a plant embryo. Typically, the seed coat is a capsule having a closed end and an open end. The synthetic gametophyte is placed within the seed coat, such that the gametophyte substantially fills the seed coat. A cotyledon restraint may be centrally located within the synthetic gametophyte. The cotyledon restraint includes a centrally located cavity extending partially through the length of the cotyledon restraint and sized to receive the plant embryo therein. The well-known plant embryo is approximately 4–7 millimeters in length and roughly 0.5 millimeters in diameter. The shape of the plant embryo is somewhat cylindrical, but is irregular in cross-section and varies in diameter along its length. The plant embryo includes a radicle end and a cotyledon end. The plant embryo is deposited within the cavity of the cotyledon restraint cotyledon end first. The plant embryo is typically sealed within the seed coat by at least one end seal.

In the past, delivery of the plant embryo within the seed coat has utilized vacuum pick-up devices to transfer the plant embryo through the manufactured seed production line. In such transfer systems that utilize vacuum pick-up devices, the plant embryos one at a time are grasped at their sides from a first position and transferred to a second position, for example, by an automated robotic arm. Attached to the end of the robotic arm is a pick-up head to which a source of vacuum is connected. The pick-up head includes a tip having a tip opening designed to grasp and hold a single plant embryo via vacuum pressure. After the pick-up head grasps the embryo, the embryo is subsequently transferred to the second position, which may be for placing the embryo into the seed coat, placing the embryo on a temporary carrier, or releasing the embryo onto a different surface in a desired location or orientation. The surface may be a temporary storage location, or a movable surface, such as a conveyor belt, movable web, or positioning table, to name a few. Once the robotic arm has transferred the pick-up device to the second position, the source of vacuum is shut off to release the embryo.

Although such plant embryo delivery systems utilizing vacuum pick-up heads are effective at transporting plant embryos, they are not without their problems. For example, a problem may exist when the vacuum pick-up head attempts to release the embryo into the seed coat or other desired locations. Specifically, in applications where the embryos are kept moist or wet (i.e.; hydrated embryos) to prevent damage from desiccation, the embryo may remain attached to the pick-up head during cessation of vacuum pressure due to the surface tension formed between the moisture on the embryo and the contact area of the pick-up head tip. In this case, to release the embryo from the vacuum pick-up head, a puff of air pressure is expelled out of the vacuum head tip opening to overcome the surface tension and to force the embryo out of the vacuum head. In some instances, the burst of air flow is either insufficient to release the embryo or too great, in which case, the embryo may be damaged by the impact force of the embryo against the bottom of the restraint. In either case, viable embryos may be wasted, which is costly in commercial applications. Further, the effects of surface tension and the conventional methods for overcoming the same may cause unwanted movement of the embryo, which in turn, affects the orientation of the embryo for insertion into the seed coat, and may lead to improper placement of or damage to the embryo.

SUMMARY OF THE INVENTION

In accordance with aspects of the present invention, a vacuum pick-up device is provided. The pick-up device includes a device body having a distal end. The device body includes a vacuum pressure supply port adapted to be connected to a source of vacuum pressure and a tip opening positioned at the distal end of the device body. The tip opening is conditionally supplied with vacuum pressure from the supply port for grasping an object. The device body further includes a release assist device movably coupled to the device body. The movement of the release assist device substantially shuts off the supply of vacuum pressure to the tip opening and causes a portion of the release assist to be extended through the tip opening and protrude past the distal end.

In accordance with another aspect of the present invention, a material handling system transports plant embryos from a first location to a second location. The material handling system includes a pick-up device interchangeably mounted to a robot arm. The pick-up device includes an outer tubular member having proximal and distal ends and defining an elongated bore. The outer tubular member includes a port disposed through a side portion thereof that is in fluid communication with the outer tubular member bore. the pick-up device also includes an inner tubular member having proximal and distal ends. The inner tubular member defines an elongate bore having a tip opening at the inner tubular member distal end. The inner tubular member is disposed within the outer tubular member bore and fixed thereto. The inner tubular member includes a port disposed through a portion thereof that is in fluid communication with the inner tubular member bore. The inner tubular member port is spaced apart from the outer tubular member port. The pick-up device further includes a sealed chamber formed between the inner and outer tubular members and a mechanical release assist device having first and second ends. The sealed chamber interconnects the outer tubular member port with the inner tubular member port. The mechanical release assist device is disposed within the inner tubular member bore. The mechanical release assist device is movable between an extended position and a retracted position. In the extended position, the mechanical release assist device blocks fluid communication between the inner tubular member port and the tip opening.

In accordance with still another aspect of the present invention, a method for grasping and releasing an object with a pick-up device is provided. The method includes providing a pick-up device that includes a vacuum pressure supply port, a tip opening positioned at the distal end of the device body, and a release assisting device having a first and an second position. The vacuum pressure supply port is in fluid communication with the tip opening when the release assisting device is in the first position. The method further includes moving the pick-up device to a first location for grasping an object, supplying vacuum pressure to the tip opening, and grasping the object at the tip opening with the supplied vacuum pressure. The object is transferred to a second location and released by moving the release assisting device from the first position to the second position.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention will now be described with reference to the accompanying drawings where like numerals correspond to like elements. The present invention is directed to a pick-up device suitable for use in a material handling system that utilizes vacuum pressure to grasp and release objects, such as plant embryos. Specifically, the present invention is directed to a vacuum pick-up device that grasps small objects, such as 0.2–10 millimeters in width and 2–20 millimeters in length, using vacuum pressure and releases such grasped objects via the cessation of vacuum pressure in conjunction with a mechanical release assist device. While the present invention is explained below and illustrated herein for use with plant embryos, it will be appreciated that other objects of similar dimensions, such as electrical or mechanical components, may be transferred from one location to another by a suitable material handling system utilizing aspects of the present invention. Accordingly, the following descriptions and illustrations herein should be considered illustrative in nature, and not limiting the scope of the present invention, as claimed.

Figure 1:
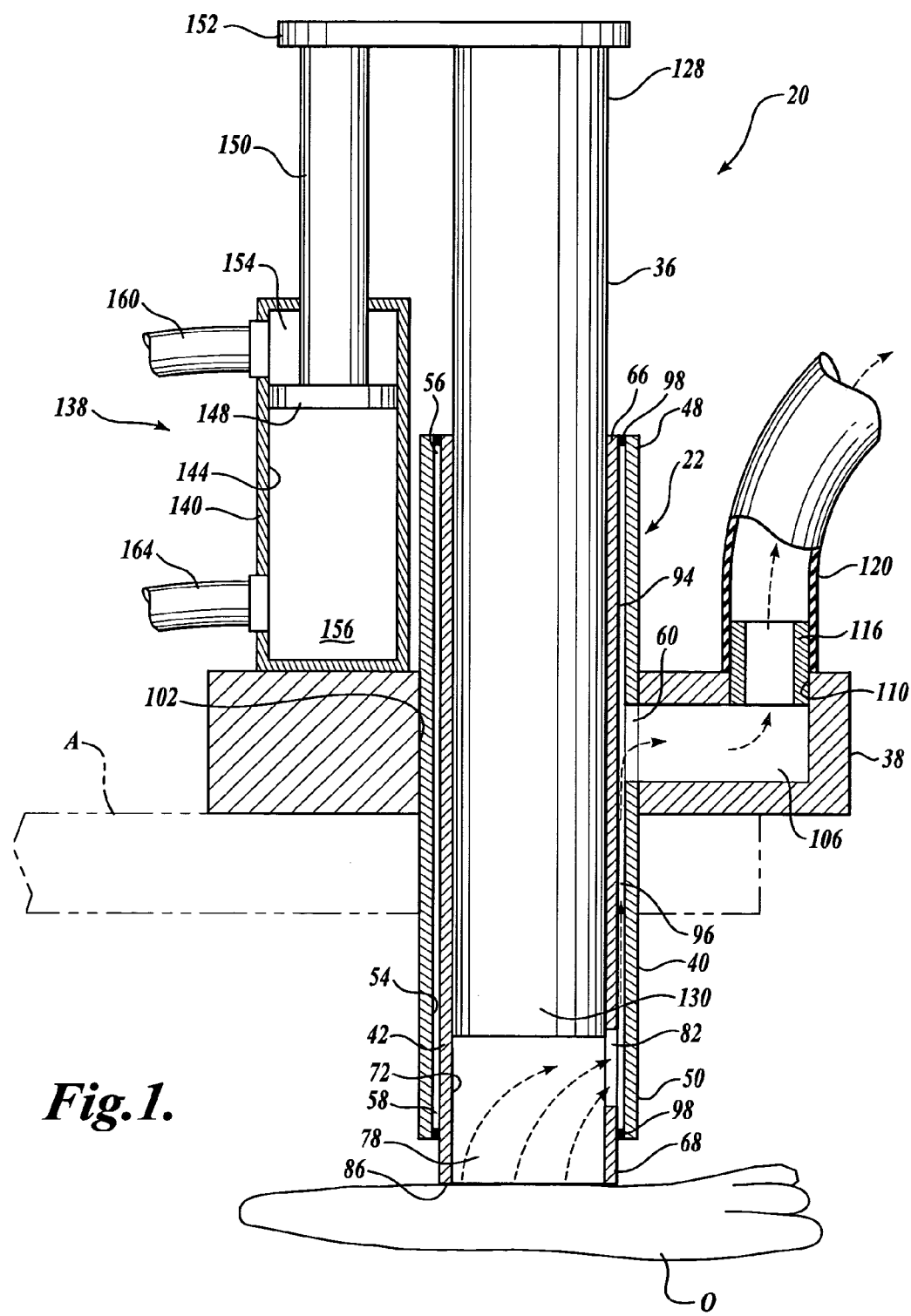
FIG. 1 is a side cross sectional view of a vacuum pick-up device coupled to an arm of an automated material handling system, wherein the mechanical release assist device is in its retracted position.

FIG. 1 is a side cross-sectional view of a representative embodiment of a vacuum pick-up device, generally designated 20, constructed in accordance with principles of the present invention. The vacuum pick-up device 20 may be interchangeably connected to an arm A (shown in phantom) of a material handling system that translates, rotates, or otherwise manipulates the pick-up device 20 between a first location and a second location. Generally described, the vacuum pick-up device 20 includes a device body 22 having a pick-up tip opening 78 to which vacuum pressure is supplied. The vacuum pick-up device 20 further includes a mechanical release assisting device 36 that assists in the release of a grasped object contemporaneously with or subsequent to the cessation of vacuum pressure. A manifold 38 may be included to efficiently and effectively supply vacuum pressure to the device body 22 from a vacuum pressure source (not shown).

Figure 2:
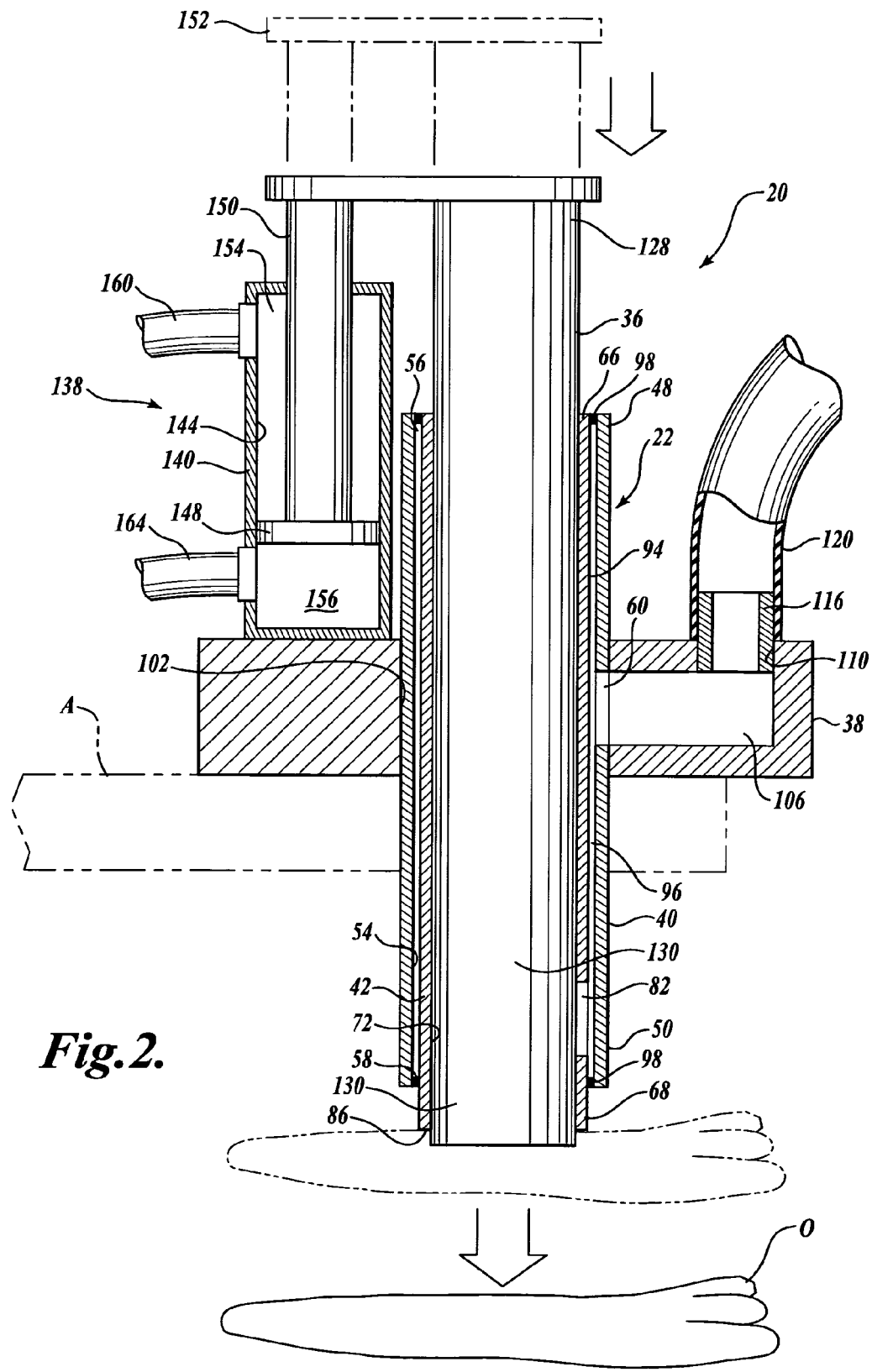
FIG. 2 is a side cross sectional view of a vacuum pick-up device of FIG. 1, wherein the mechanical release assist device is in its extended position.
Figure 5:
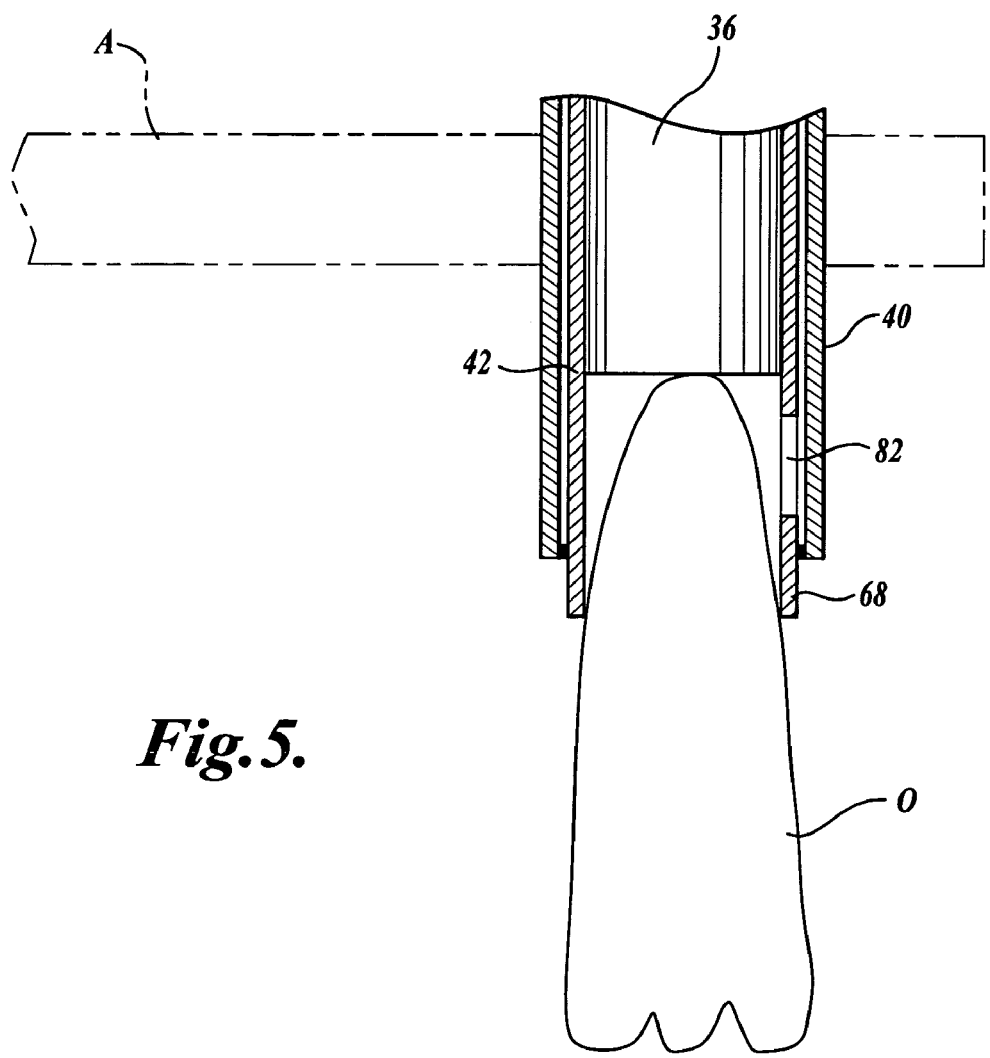
FIG. 5 is a side cross sectional view of the distal end of the vacuum pick-up device of FIG. 1 grasping a plant embryo by its radicle end.

In operation, the vacuum pick-up device 20 is transferred by the arm A to the first location for picking up or grasping an object, such as a plant embryo, at either its side as best shown in FIG. 1 or at one end, as best shown in FIG. 5. In the first location, the tip opening 78 of the device body 22 is in close proximity to or contacting the object O, as best shown in FIG. 1. Once the pick-up device 20 has attained the first location or prior to the device 20 attaining the first location, vacuum pressure is supplied to the tip opening 78 of the device body 22 for grasping the object O. Once the object O has been grasped by the vacuum pick-up device 20, the object O may be transferred by manipulation of the arm A to the second location for releasing the object. In the second or release location, the supply of vacuum pressure to the tip opening 78 of the device body 22 is shut off, and the mechanical release assist device 36 is employed to assist in the removal of the object O from the tip opening (now occupied by the mechanical release assist device 36) of the device body 22, as best shown in FIG. 2.

Referring back to FIG. 1, the components of the pick-up device 20 will now be described in turn. The pick-up device body 22 may include an outer tubular member 40 and an inner tubular member 42. The outer tubular member 40 is preferably constructed of a metallic or other suitably rigid material. The outer tubular member 40 has a proximal end 48 and a distal end 50. The outer tubular member 40 includes a longitudinally extending bore 54 that defines openings 56 and 58 at the proximal and distal ends 48 and 50 of the outer tubular member 40, respectively. A port 60 is formed in a side portion of the outer tubular member 40, and may be disposed orthogonal to the axis of the bore 54. The port 60 is in fluid communication with the bore 54 and is adapted to be connected to the vacuum pressure source (not shown) for supplying vacuum pressure to the bore 54.

Still referring to FIG. 1, the inner tubular member 42 is likewise constructed of a metallic material, such as stainless steel, or other suitably rigid material, such as plastic. The inner tubular member 42 has proximal and distal ends 66 and 68, and is suitably dimensioned in cross section to be cooperatively received within the outer tubular member bore 54. Specifically, the cross section of the inner tubular member 42 is such that a cavity 94 is formed between the inner tubular member outer surface and the outer tubular member inner surface when assembled. The inner tubular member 42 includes a longitudinally extending bore 72 that defines a proximal opening (hidden in FIG. 1) at the proximal end 66 of the inner tubular member 42 and the tip opening 78 at the distal end 68 of the inner tubular member 42. A port 82 is formed in the inner tubular member 42 in close proximity to its distal end 68. The port 82 is in fluid communication with the bore 72, and thus, the tip opening 78.

Figure 3:
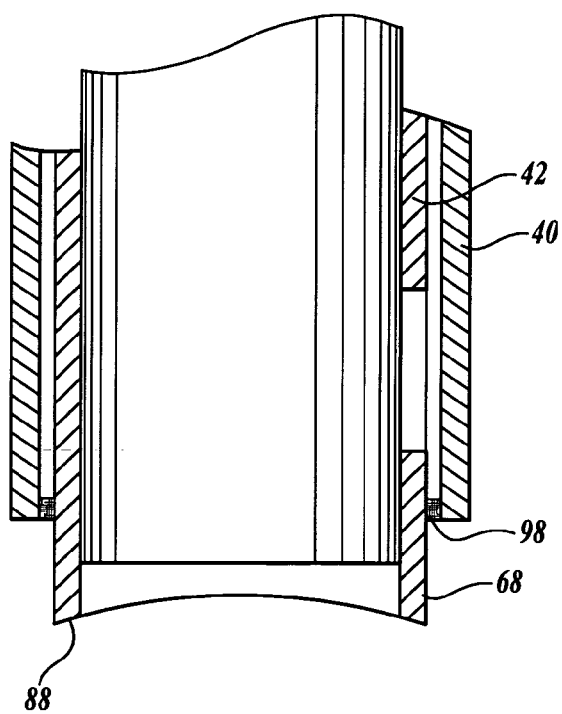
FIG. 3 is a side cross sectional view of an alternative embodiment of the distal end of the vacuum pick-up device constructed in accordance with aspects of the present invention.
Figure 4:
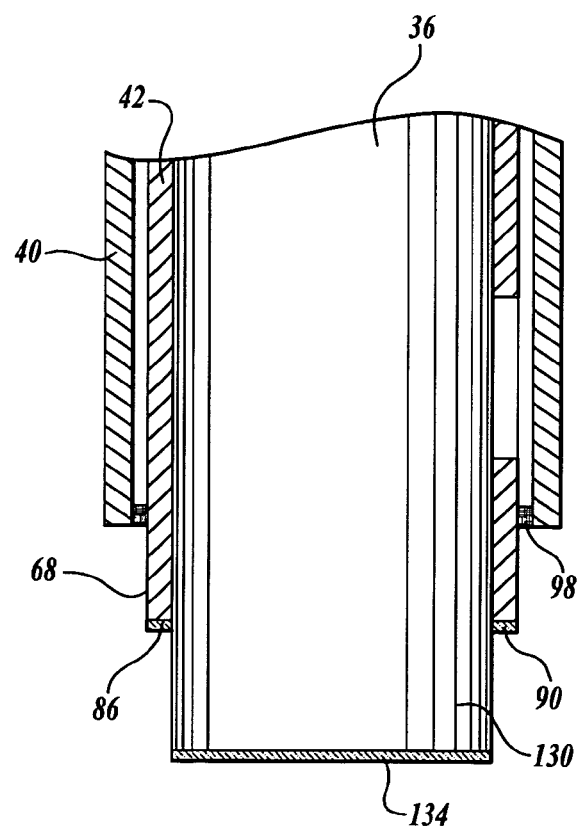
FIG. 4 is a side cross sectional view of another alternative embodiment of the distal end of the vacuum pick-up device constructed in accordance with aspects of the present invention.

In the embodiment shown in FIG. 1, the distal end 68 of the inner tubular member 42 terminates in a flat contact face 86 that is substantially orthogonal to the axis of the bore 72. Alternatively, as best shown in FIG. 3, the distal end 68 of the inner tubular member 42 may terminate in a curved or concave contact face 88 that corresponds substantially to the outside surface of the plant embryo for providing an improved contact interface therebetween. Additionally, as best shown in FIG. 4, the distal end contact face 86 may be coated with a friction reducing medium 90, such as PTFE or nylon, or alternatively, any hydrophobic medium known in the art. It will be appreciated that other surfaces may also be coated, such as the inner bore surfaces of the distal end 68 of the inner tubular member 42, if desired.

In the device body's assembled state, the inner tubular member 42 is coaxially disposed within the outer tubular member bore 54 and fixedly secured thereto, as best shown in FIGS. 1 and 2. The inner tubular member 42 is dimensioned such that the distal end 68 of the inner tubular member 42 extends past the distal end 50 of the outer tubular member 40 a selected amount. As such, the protruding distal end 68 of the inner tubular member 42 forms the tip of the device 20. In one embodiment, the tip of the device may be slightly flared (not shown) to facilitate pickup of the embryo. The flared tip may be integrally formed with the tip of the device or may alternatively be formed by connecting shrink tubing to the tip of the device.

As was described above, the outer circumference of the inner tubular member 42 is further dimensioned such that a cavity 94 is formed between the outer surface of the inner tubular member 42 and the inner surface of the outer tubular member 40. A fluid tight chamber 96 may be formed from the cavity 94 by sealing the cavity 94, for example, at the proximal and distal ends of the outer tubular member 40 via welds 98 or other sealable connecting methods known in the art, such as soldering, chemical bonding, adhesives, epoxy, etc. As such, the inner tubular member port 82 is interconnected in fluid communication with the outer tubular member port 60 via the sealed chamber 96. It will be appreciated that the sealable connections between the outer and inner tubular members 40 and 42 may be located anywhere along the cavity 94 as long as the resultant sealed chamber 96 interconnects the outer tubular member port 60 and the inner tubular member port 82. It will be further appreciated that the sealable connections may also be strong enough to fixedly secure the members together.

To effectively and efficiently supply vacuum pressure to the port 60, the vacuum pick-up device 20 may also include the manifold 38. The manifold 38 includes a bore 102 suitably sized to receive the outer tubular member 40 in a movably seated fashion. The manifold 38 includes a passageway 106 that fluidly interconnects the bore 102 with a manifold opening 110. When assembled, the manifold 38 may be slid over the outer tubular member 40 and positioned such that the passageway 106 is aligned with the port 60. The manifold 38 may then be welded or otherwise secured, for instance, using cooperating threaded surfaces, to the outer tubular member 40. Regardless of the method of securely connecting the manifold 38 to the outer tubular member 40, it is preferable that a sealed connection therebetween is established. A fitting 116 may be included for ease of connecting a vacuum supply conduit 120 to the manifold 38. The fitting 116 is connected to the manifold 38 through the manifold opening 110 in a press fit, threaded, or other secured manner known in the art. The vacuum supply conduit 120 is connect in fluid communication with a vacuum pressure source (not shown) in a conventional manner for supplying vacuum pressure to the port 60 through manifold 38. It will be appreciated that in other embodiments of the present invention, the vacuum supply conduit 120 may be connected directly to the port 60, and thus, the manifold 38 may be omitted.

The vacuum pick-up device 20 further includes a mechanical release assist device 36. The mechanical release assist device 36 is constructed in the form of a plunger that is dimensioned to guidably translate within the inner tubular member bore 72 in a seating manner. The mechanical release assist device 36 has proximal and distal ends 128 and 130, and is of a sufficient length such that its proximal and distal ends 128 and 130 protrude past the proximal and distal ends 66 and 68 of the inner tubular member 42 concurrently. When assembled, the mechanical release assist device 36 is seated within the inner tubular bore 72 and movable between a retracted position, shown best in FIG. 1, and an extended position, shown best in FIG. 2. In the retracted position, the distal end 130 of the device 36 is positioned such that the inner tubular member port 82 is in fluid communication with the tip opening 78. In the extended position, the distal end 130 of the device 36 protrudes a selected amount past the distal end 68 of the inner tubular member 42, and inhibits fluid communication between the inner tubular member port 82 and the tip opening (which is occupied by the distal end 130 of the device in FIG. 2). As such, when the mechanical release assist device 36 moves from its retracted position to its extended position, the following occur: 1) vacuum pressure is shut off to the tip opening 78 by the seating engagement of the device against the inner tubular member port 82; and 2) the distal end of the device 36 extends through the tip opening 78 and protrudes past the distal end 68 of the inner tubular member 42.

In one embodiment, shown best in FIG. 4, the distal end 130 of the mechanical release assist device 36 may be coated with a friction reducing medium 134, such as PTFE or nylon, or any known hydrophobic medium to further reduce problems with surface tension adhesion. Alternatively, the mechanical release assist device 36 may be constructed out of a friction reducing medium or hydrophobic medium, as long as the selected medium provides sufficient rigidity to be movable between the retracted and extended positions by an actuator, as will be described in detail below.

To effect movement of the mechanical release assist device 36 between the retracted and extended positions, an actuator 138 may be provided. The actuator 138 may be any known or future developed actuator suitable for moving the mechanical release assist device 36 between the retracted and extended positions. One suitable actuator that may be used is a conventional fluid cylinder/piston actuator. Others, such as solenoids, linear screw mechanisms, etc. may also be used.

In the embodiment shown, the cylinder/piston actuator is supported by the manifold 38; however, the actuator also may be connected to the device body 22, such as to the outer tubular member 40. The fluid cylinder/piston actuator includes a cylinder 140 and a piston 144. The cylinder 140 defines a sealed interior cavity 144 in which the piston 148 is movably contained. A shaft 150 is connected to the piston 148 for movement therewith, and extends from the piston 148 to a position exterior of the cylinder 140. The exterior end of the shaft 150 is connected to the proximal end 128 of the mechanical assist device 36 through a connector plate 152 so that movement of the shaft 150 is transmitted to the mechanical release assist device. The piston 148 divides the interior cavity 144 into first and second sealed chambers 154 and 156. Fluid supply/discharge conduits 160 and 164 are connected in fluid communication with the first and second chambers 154 and 156, respectively, for supplying pressured fluid thereto and for permitting the discharge of fluid from the chambers. A conventional pressurized fluid source (not shown) and a conventional valve arrangement (not shown) are connected to the fluid conduits 160 and 164 in a conventional manner for alternatingly pressurizing one chamber while venting the other chamber to atmosphere, causing the piston to translate between the positions shown in FIGS. 1 2.

The operation of the vacuum pick-up device 20 will now be described in detail with reference to FIGS. 1 and 2. The vacuum pick-up device 20 is transferred by the arm A to a first location for picking up or grasping the object O, such as a plant embryo. To grasp the object O in the first location, the mechanical release assist device 36 is in its retracted position so that the inner tubular member port 82 is in fluid communication with the tip opening 78, and vacuum pressure is supplied to the tip opening 78 via the outer tubular member port 60. It will be appreciated that the vacuum pressure source may supply vacuum pressure constantly to the port 60 during the entire operation of the pick-up device 20, or may conditionally supply vacuum pressure thereto by the inclusion of a separate controllable switching mechanism that turns on the supply of vacuum pressure to the port 60 prior to the realization of the first location or once the pick-up device 20 has attained the first location. In either case, vacuum pressure supplied to the port 60 is supplied contemporaneously with or slightly subsequent to the tip opening 78 via the sealed chamber 96 for grasping the object O. Once the object O has been grasped, the pick-up device 20 may be transferred to the second location for releasing the object O.

To release the object O in the second location, the mechanical release assist device 36 is translated by the actuation of the actuator 138 from its retracted position to it extended position. As the mechanical assist device 36 translates to its extended position, a portion of the mechanical assist device 36 blocks the inner tubular member port 82, thereby inhibiting the supply of vacuum pressure to the tip opening 78. The mechanical release assist device 36 continues to guidably translate within the bore 72 of the inner tubular member 42 until its distal end 130 protrudes past the distal end 68 of the inner tubular member 42. As the distal end 130 protrudes past the inner tubular member 42, the distal end 130 contacts the object O and separates the object O from the contact face 86 and tip opening 78 of the pick-up device 20, as best shown in FIG. 2. As such, the mechanical release assist device 36 contemporaneously shuts off vacuum pressure applied to the object O and physically contacts the object O, thereby separating the object O from the contact face 86 of the device body 22.

Once the object O has been released from the pick-up device 20, the mechanical release assist device 36 may be translated to its retracted position, and the pick-up device 20 may then return to the first location to grasp another object O. During the return to the first position, the supply of vacuum pressure to the port 60 may be shut off by the optional switching mechanism, if desired.

Figure 6:
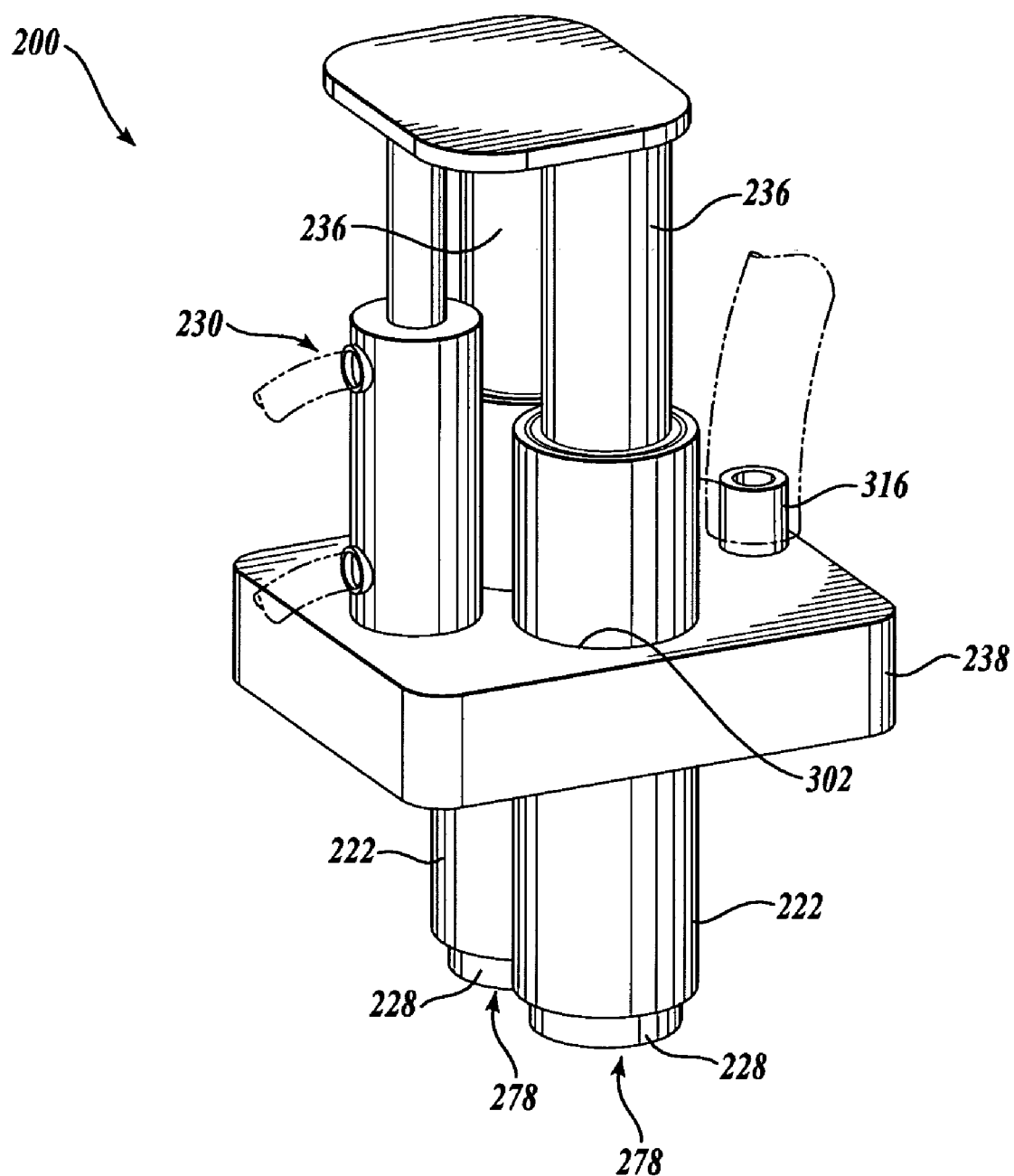
FIG. 6 is a perspective view of another embodiment of a vacuum pick-up device constructed in accordance with aspects of the present invention.

FIG. 6 is a perspective view of another embodiment of a vacuum pick-up device 200 constructed in accordance with aspects of the present invention. The vacuum pick-up device 200 is substantially identical in materials, construction, and operation as the vacuum pick-up device 20 of FIGS. 1–4, except for the differences that will now be explained. For clarity in the ensuing description, numerical references of like elements of vacuum pick-up device 20 will be used but will begin with the prefix "2xx". The vacuum pick-up device 200 includes two device bodies 2xx coupled together in a side-by-side arrangement. As such, the vacuum pick-up device 200 includes two distal tip ends 228 defining tip openings 278 for grasping an object. Each device body 222 slidably receives a mechanical release assist device 236, the proximal ends of both being coupled to an actuator 230, which is substantially similar in construction and operation as actuator 138 (FIG. 1) described above. A manifold 238 may be included to provide an efficient connection between the device bodies 222 and the vacuum pressure source (not shown). The manifold 238 includes a modified bore 302 for receiving the side-by side arrangement of the dual device bodies 222. The manifold 238 defines a passageway (not shown) that fluidly interconnects an exterior manifold fitting 316 and the outer tubular member ports (hidden in FIG. 6) of the device bodies 22. The vacuum pick-up device 200 with dual tip openings 278 is believed by the inventors to be more effective in grasping an embryo at its side than prior art devices, while substantially maintaining the embryo alignment once grasped.

The embodiments of the present invention provide several advantages over currently available embryo delivery systems, some of which will now be explained. First, by employing the mechanical release assist device in conjunction with the cessation of vacuum pressure, the force exerted on the embryos can be precisely controlled by adjusting the speed and acceleration at which the mechanical release assist device 36 contacts the embryo, minimizing potential damage to the embryos. Secondly, by employing the mechanical release assist device 36, the objects are separated from the devices 20 and 200 in the same orientation as they were grasped regardless of the amount of moisture on the embryos or the dimensions of the contact area of the devices 20 and 200 against the embryo.

While the preferred embodiments of the invention have been illustrated and described, it will be appreciated that various changes can be made therein without departing from the spirit and scope of the invention, as claimed. For example, in one embodiment, the outer tubular member 40 may be omitted, and the manifold 38 or vacuum supply conduit 120 may be directly coupled to the inner tubular member port 82.

The embodiments of the invention in which an exclusive property or privilege is claimed are defined as follows:

1. A vacuum pick-up device, comprising:
    a first device body having a distal end, the first device body including a first vacuum pressure supply port, a first tip opening positioned at the distal end of the first device body, the first tip opening being conditionally supplied with vacuum pressure from the first vacuum pressure supply port for grasping an object, and a first release assisting device movably coupled to the first device body, wherein movement of the first release assisting device substantially shuts off the supply of vacuum pressure to the first tip opening and causes a portion of the first release assisting device to be extended through the first tip opening and protrude past the first device body distal end.

2. The vacuum pick-up device of claim 1, further comprising a second device body having a distal end, the second device body including a second vacuum pressure supply port, a second tip opening positioned at the distal end of the second device body adjacent the first tip opening, the second tip opening being conditionally supplied with vacuum pressure from the second vacuum pressure supply port for grasping an object, and a second release assisting device movably coupled to the second device body, wherein movement of the second release assisting device substantially shuts off the supply of vacuum pressure to the second tip opening and causes a portion of the second release assisting device to be extended through the second tip opening and protrude past the second device body distal end.

3. The vacuum pick-up device of claim 1, wherein the first device body includes a first tubular member having a bore that defines the first tip opening, and wherein the first tubular member includes the first vacuum supply port, the first release assisting device being movably mounted within the first tubular member bore.

4. The vacuum pick-up device of claim 3, wherein the first device body further includes a second tubular member defining a bore, the first tubular member disposed within the second tubular member bore and secured thereto.

5. The vacuum pick-up device of claim 4, wherein the second tubular member includes a vacuum pressure inlet port, the vacuum pressure inlet port being adapted to be connected to a source of vacuum pressure.

6. The vacuum pick-up device of claim 5, further comprising a sealed chamber formed between the first tubular member and the second tubular member, the sealed chamber in fluid communication with the vacuum pressure inlet port and the first vacuum pressure supply port.

7. The vacuum pick-up device of claim 1, further comprising a manifold connected to the first device body, the manifold including a passageway in fluid communication with the first vacuum pressure supply port and adapted to be connected to a vacuum pressure source.

8. The vacuum pick-up device of claim 1, wherein the distal end of the first release assisting device or first device body includes a friction-reducing or hydrophobic medium.

9. The vacuum pick-up device of claim 1, further comprising an actuator having an extendable member, the extendable member fixedly coupled to the first release assisting device for effecting movement of the first release assisting device.

10. In a material handling system that transports plant embryos from a first location to a second location, and having a pick-up device interchangeably mountable to a robot arm, the pick-up device comprising:

an outer tubular member having proximal and distal ends and defining an elongated bore, the outer tubular member including a port disposed through a side portion thereof that is in fluid communication with the outer tubular member bore;

an inner tubular member having proximal and distal ends, the inner tubular member defining an elongate bore having a tip opening at the inner tubular member distal end, the inner tubular member being disposed within the outer tubular member bore and fixed thereto, wherein the inner tubular member includes a port disposed through a portion thereof that is in fluid communication with the inner tubular member bore, the inner tubular member port being spaced apart from the outer tubular member port;

a sealed chamber formed between the inner and outer tubular members, the sealed chamber interconnecting the outer tubular member port with the inner tubular member port, and a mechanical release assist device having first and second ends, the mechanical release assist device disposed within the inner tubular member bore, the mechanical release assist device being movable between an extended position and a retracted position, wherein the mechanical release assist device blocks the fluid communication between the inner tubular member port and the tip opening in the extended position.

11. The device of claim 10, further including an actuator having an extendable member, the extendable member fixedly coupled to the mechanical release assist device for effecting movement of the mechanical release assist device between the mechanical release assist device retracted and extended positions.

12. The device of claim 10, wherein the distal end of the inner tubular member terminates in a substantially flat contact face oriented orthogonal to the longitudinal axis of the device.

13. The device of claim 10, wherein the distal end of the inner tubular member terminates in a concave contact face.

14. The device of claim 10, wherein the distal end of the mechanical release assist device or inner tubular member includes a friction-reducing or hydrophobic medium.

* * * * *